United States Patent [19]
Gianessi

[11] 3,871,961
[45] Mar. 18, 1975

[54] METHOD FOR ACCELERATING THE GROWTH AND INCREASING THE YIELD OF MICROORGANISMS

[76] Inventor: Matilde Gianessi, Via Baldissera 2, Milan, Italy

[22] Filed: Mar. 15, 1973

[21] Appl. No.: 341,792

[52] U.S. Cl.................. 195/37, 195/81, 195/1, 195/139, 195/104
[51] Int. Cl............................................. C12b 1/22
[58] Field of Search............ 195/108, 104, 37, 81, 1

[56] References Cited
OTHER PUBLICATIONS
Nostran et al., Applied Microbiology, May 1967, pages 561–563 (1967)

Gerencser et al., Nature, Vol. 196 pages 539–541 (1962).

Primary Examiner—Alvin E. Tanenholtz
Attorney, Agent, or Firm—Young & Thompson

[57] ABSTRACT

A method for causing the acceleration and the increment of growing of micro-organisms, wherein the culture, immersed in a suitable liquid nutrient medium, is exposed to the action of a magnetic field, generated by a coil, having preferably a ferromagnetic core, and to which an A.C. is fed.

4 Claims, 1 Drawing Figure

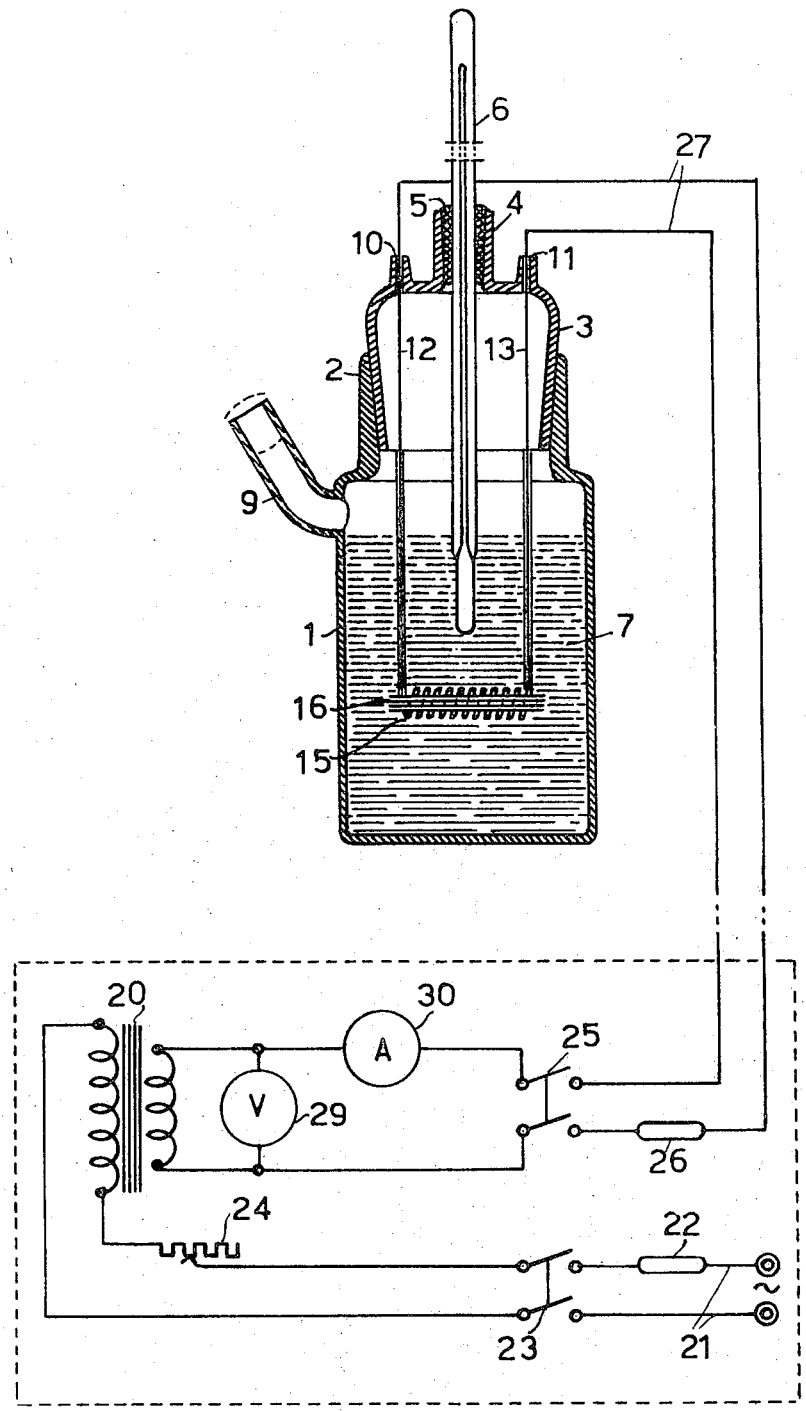

METHOD FOR ACCELERATING THE GROWTH AND INCREASING THE YIELD OF MICROORGANISMS

BACKGROUND OF THE INVENTION

As well known, many species of micro-organisms have a big importance in many phenomena of organic life, as well as in a large number of industrial applications, as e.g., in the fermentation of sugars into ethyl alcohol, in the fermentation of starchs and sugars with formation of different organic acids and evolution of carbon dioxide (yeasts), in the preparation of drugs (e.g., of antibiotics), for the incorporation of chemical groups into the steroids (e.g., in the testosterone), for obtaining a few useful natural fermentations, etc.

According to what has been heretofore ascertained by biological science, the growth of micro-organisms essentially depends on the constitution of so called "culture media" (which may be, e.g., meat broth, gelatine, blood serum, milk and so on), on the temperature of said culture media, which should usually be in the range of 20° and 45°C, on the concentration of hydrogen ions (or pH) in the nutrient liquid and, in the case of aerobe microorganisms, on the exchange of gases between said liquid and the ambient air.

However, it has been ascertained by the inventor, upon confirmation of many experimental results, that in addition to conditions as stated above - i.e., constitution, temperature, pH and possible gas exchange of nutrient liqid, a material acceleration of growth of microorganisms as well as an appreciable increase in the amount thereof can be effected by keeping a coil, formed by at least a few dozens of insulated lead turns, and to which an electric alternating current is fed, immersed in the inoculated culture medium. Even better results can be ofter obtained, above all when particular electrochemical features are shown by the culture medium, by having a core of a ferromagnetic material located inside the coil, but insulated therefrom.

For carrying the above procedure into practice, the hereinafter stated means are required: a container made of a material capable to stand up to the temperature at which an efficient sterilization can be obtained; heating means by which the culture medium can be maintained at a temperature in the range of 20° – 25°C; a coil formed by a few dozens of turns, wound in the shape of a cylindric helix about a ferromagnetic core, and a source of electric current for suitably energizing said coil.

An equipment which, while being rather simple, allows one however to obtain very good results, has been realized by the inventor.

Such equipment comprises: a glass bottle, having a tapered mouth formed at its top, and also a tapered ground glass stopper for closing said mouth and formed with an axial through bore for the introduction of the tube of a liquid thermometer, as well as with two also through holes for the metal electrodes whose outer ends are connected with the terminals of a coil that consists of a cylindric helix shaped winding with mutually insulated turns, and to which a low voltage, alternating current can be fed, one side of said bottle being formed with an orifice or nipple for the inoculation, as well as for assisting - when required - the exchange of gases between the nutrient liquid and the ambient air.

The equipment according to the invention and the related current feeder are diagrammatically shown, as simplified embodiment forms, in the accompanying drawing, which is a longitudinal vertical section of the equipment, fitted with a diagrammatically shown current feeder.

In said FIGURE, 1 is the glass bottle, 2 is the mouth thereof and 3 is the tapered ground glass stopper by which said mouth is closed.

Said stopper 3 is formed with an axial through bore 4 into which the tube 6 of a mercury thermometer is inserted with the aid of a suitable packing 5, such thermometer being designed for monitoring the temperature of liquid nutrient medium 7, previously filled into the bottle through the side nipple 9. Stopper 3 is also formed with two through holes 10–11 Wherein the electrodes 12–13 are inserted and fastened. Electrically connected with the free ends of said electrodes are the terminals of a coil 15, consisting of a few dozens of turns of an insulated lead, wound in the form of a cylindric helix about a ferromagnetic core 16, which is coated with an insulating layer.

In the simplest embodiment of the equipment, said core may consist of a number of insulated wires of annealed soft iron.

The current feeder of which in the FIGURE the wiring diagram is shown, comprises a step-down transformer 20, which is fed from the mains 21 through a fuse 22, a switch 23 and a rheostat 24, being the terminals of secondary of transformer 20 connected, through a switch 25 and a fuse 26, with the line 27, through which current is fed to electrodes 12–13, and thus to coil 15. Inserted between the secondary of step-down transformer 20 and the switch 25 are, according to conventional connections, a voltmeter 29 and an ameter 30.

In the preferred embodiment of the invention, the coil 15 consists of a few dozens of turns of insulated platinum wire, in contact with one another. The intensity of current that flows across the platinum wire by which the coil 15 is formed, can be easily adjusted by means of rheostat 24.

A few experimentally obtained results are given below, as an example only.

It is to be first of all said that duplicate tests were always conducted, i.e., a control test, without the use of the method as described above, and an experimental test by the method according to the invention, both under the same conditions of constitution, temperature, pH and gas exchange of nutrient medium. The results as repeatedly obtained in a number of tests were as follows:

No. 1

| | |
|---|---|
| Tested stock: | Penicyllum Weidemanni |
| Culture medium: | Czapek liquid (Glucose 50 g., Sodium nitrate 2 g., potassium monophosphate 1 g., magnesium sulphate 0.5 g., potassium chloride 0.5 g., iron chloride 0.01 g., water 1,000 ml., Final pH: 4.5). Good conductivity of A.C. in the range of 2.5 – 3 Volt. |
| Inoculation: | 1 % of spores. |
| Electrical conditions: | Coil having 45 turns of platinum wire wound about a magnetic core. |
| Culture temperature: | 25°C in a thermostat controlled water bath. |

Stabilisation at the electrical indicating instruments: A.C.

$V = 1$; Amp. $= 1.8$, $1° \angle \Delta T \angle 1.5°C$.

After 50 hrs of culture, the formation of spores was noticed in both samples. The mycelium was filtered, washed, dried and weighed. The following results were obtained:

| | |
|---|---|
| Weight of mycelium (control test) | 0.0262 g. |
| Weight of mycelium obtained by the method according to the invention | 0.0540 g. |

An increase of 106 percent in the growth was thus obtained.

No. 2

| | |
|---|---|
| Tested stock: | Saccaromyces lactis (yeast causing a fermentation of lactose). |
| Culture medium: | Chlorhydric whey of skimmed milk.<br>Final pH: 4.3<br>Lactose contents: 5.42 %<br>Good conductivity of A.C. at ab. 2.6 V. |
| Inoculation: | 1 % from a pure culture. |
| Electrical conditions: | Coil having 50 turns of platinum wire, wound about a magnetic core. |
| Culture temperature: | 30°C in a thermostat controlled water bath. |
| Stabilisation at the electric indicating instruments: A.C. | |

1.4 V, 1.9 Amp., 1° $\angle \Delta T \angle$ 1.5°C.

After 42 hrs of culture, an appreciable decrease in the formed foam was noticed, and the residual lactose was titrated according to Fehling.

| | |
|---|---|
| Lactose residuum of control test | 2.414 % |
| Lactose residuum of test by the use of method according to the invention | 1.200 % |

An increase of ab. 20 percent in the fermentative activity on the initial lactose is thus attained.

What I claim is:

1. A method for accelerating the growth of the microorganism Penicillum Widemanni, comprising establishing a liquid culture medium of said microorganism, immersing a coil comprising a few dozens of insulated turns of electrically conductive material in said culture medium, passing through said coil an alternating current having a voltage of 1 and an amperage of 1.8, and maintaining said coil immersed in said medium, with said current passing therethrough for a period of time sufficient to achieve the growth of a substantial quantity of said microorganism.

2. A method as claimed in claim 1, and providing said coil with a ferromagnetic core.

3. A method for increasing the fermentative activity of the microorganism Saccaromyces lactis, comprising establishing a liquid culture medium of said microorganism containing lactose, immersing a coil comprising a few dozens of insulated turns of electrically conductive material in said culture medium, passing through said coil an alternating current having a voltage of 1.4 and an amperage of 1.9, and maintaining said coil immersed in said medium with said current passing therethrough for a period of time sufficient to increase substantially the fermentative activity of said microorganism on said lactose.

4. A method as claimed in claim 3, and providing said coil with a ferromagnetic core.

* * * * *